Feb. 23, 1932.　　　　C. A. RICH　　　　1,846,497
SCREW MACHINE
Filed May 28, 1929　　5 Sheets-Sheet 1

Fig 1

INVENTOR
Charles A. Rich
BY Van Everen Fish
Hildreth & Cary
ATTORNEYS

FIG 2

Feb. 23, 1932.  C. A. RICH  1,846,497
SCREW MACHINE
Filed May 28, 1929   5 Sheets-Sheet 3

INVENTOR
Charles A. Rich
By Van Everen Fish
Hildreth Heavy
ATTORNEYS

Feb. 23, 1932.    C. A. RICH    1,846,497
SCREW MACHINE
Filed May 28, 1929    5 Sheets-Sheet 5

INVENTOR
Charles A. Rich
By Van Everen Fish
Hildreth Hary
ATTORNEYS

Patented Feb. 23, 1932

1,846,497

UNITED STATES PATENT OFFICE

CHARLES A. RICH, OF PROVIDENCE, RHODE ISLAND, ASSIGNOR TO BROWN AND SHARPE MANUFACTURING COMPANY, A CORPORATION OF RHODE ISLAND

SCREW MACHINE

Application filed May 28, 1929. Serial No. 366,671.

The present invention relates to screw and similar machines for fashioning articles successively from bar stock, and more particularly to a mechanism suitable for use in machines of this type for positioning the stock for the operation of the operating tools. The invention is herein disclosed as embodied in an automatic screw machine which is provided with a magazine for storing additional stock and an automatic magazine feed for transferring a new bar of stock to the machine as an old bar in the machine becomes exhausted.

In certain classes of work which are turned out on automatic screw and similar machines, after each cutting-off operation, a shouldered end portion is fed against the stock stop to position the work and the requisite tools are then brought into operation to finish and cut off the article. Where certain of these operations are performed on the portion of the bar having the reduced diameter, as for instance, in the production of small screws where a die is brought into thread the screw, it is essential that the shouldered portion of the work be accurately positioned with relation to the stock stop to prevent interference with the tools and consequent damage to the parts. Difficulty in properly positioning the work arises primarily when a new bar is placed in the machine, due to the fact that the feeding devices tend to act automatically to advance the raw end of the new bar into contact with the stock stop, or if the bar is positioned for a preliminary cutting-off operation, the reduced end formed may through faulty positioning of the bar be less than the regulation length, which will result in bringing the shouldered portion of the bar into contact with the tools upon the next feeding operation.

It is, therefore, one object of the present invention to provide means adapted for use in classes of work where a portion of the leading end of the bar is reduced in diameter prior to each cutting-off operation which will act automatically to limit the advance of the shouldered portion of the bar.

It is a further object of the present invention to provide means of this description which will be particularly adapted for use with the automatic magazine feed herein described to prevent the advance of the leading end of a new bar prior to the formation thereon of a reduced end of the desired length to a point at which it will interfere with the proper operation of the tools.

For certain classes of work, it is found advisable to employ a stock stop for positioning the work after each cutting-off operation which is mounted in a turret on the machine. It is a further object of the present invention to provide means for automatically moving this stop out of the operative position to which it is brought by the indexing movement of the turret, when a new bar is inserted, in order to permit the ejection of the waste end of the old bar.

Other objects of the invention are to modify and improve certain features of construction and operation of the machine hereinafter more fully to be described.

With these objects in view, the several features of the invention consist in the devices, combinations and arrangement of parts hereinafter described and claimed, which together with the advantages to be obtained thereby, will be readily understood by one skilled in the art from the following description taken in connection with the accompanying drawings.

For a more complete description of the machine herein disclosed as embodying the several features of the present invention, reference may be had to the inventor's pending application, Serial No. 233,753, filed November 17, 1927.

Figure 1:
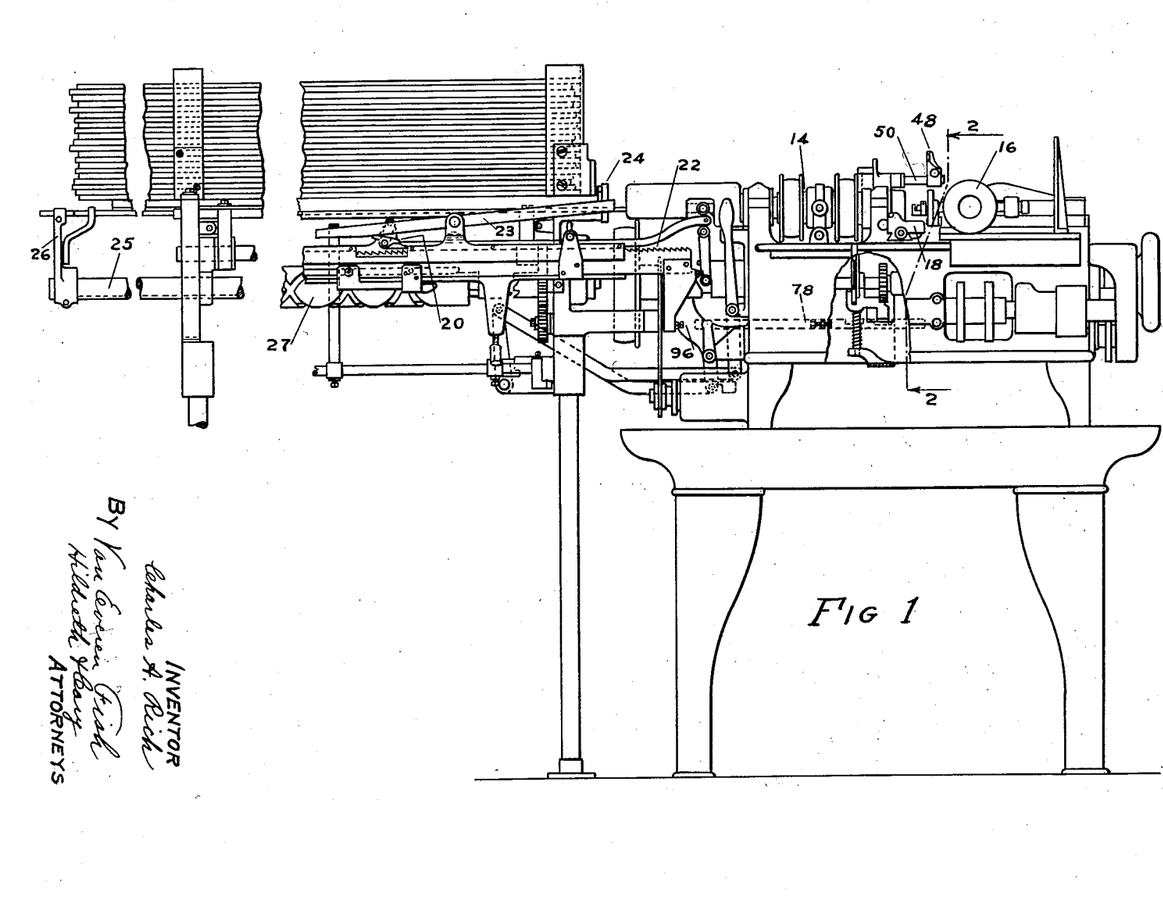
Fig. 1 is a view in side elevation of an automatic screw machine provided with a magazine for storing additional stock and an automatic feeding mechanism for transferring new bars of stock to the machine upon exhaustion of an old bar, so much only of the machine being shown as is necessary to show the connection of the present invention therewith.

This machine is provided with a rotary spindle 14 through which bar stock is fed to the operating tools, a turret 16 for indexing the operating tools successively to perform the required operations on the work and two cross slides, the front slide being shown at 18 in Fig. 1. The machine is further provided with a magazine for storing additional bar stock and a magazine feeding device for automatically placing a new bar of stock in the spindle upon exhaustion of the old bar. This mechanism which is in all respects similar to the mechanism described in the above-mentioned application, comprises a continuously oscillating pawl 20 which acts when it is rendered operative to engage with and advance a rack bar 22 of the timing mechanism step-by step with each succeeding cycle of operations of the machine and to stop the machine and throw the automatic feed mechanism into operation when the bar feeding in the machine becomes entirely exhausted. The oscillating pawl 20 is normally held out of operative position with relation to the rack bar by the engagement of a tail on the pawl with one end of a lever 23 which is normally supported at its other end on a drop lever 24 which rides on the feeding bar. When the rear end of the feeding bar rides out from under the drop lever 24, the pawl 20 is permitted to engage with and advance the rack bar 22 to throw out the machine clutch and put the automatic feed mechanism into operation to eject the waste end of the old bar from the machine and to feed a new bar into operating position in the spindle. The feeding mechanism comprises a feed bar indicated at 25, which carries adjustably mounted at its rear end a pusher member 26 adapted to engage with the rear end of a new bar to be fed into the machine, and is given a lengthwise feeding movement to feed the new bar into the spindle of the machine by means of the spiral cam indicated at 27. After the new bar has been fed into operating position in the spindle, the machine is automatically put in operation again and the rack bar 22 and the feeding bar 25 are returned to the original positions shown in Fig. 1.

After each cutting-off operation, the leading end of the bar is fed against a stock stop to position the bar for the next cycle of operations of the forming and cutting-off tools. The machine as disclosed in the drawings, is arranged to permit the employment alternatively of either the swing stock stop shown at 28 in Figs. 3 and 4, which is moved into operating position during each cycle of operations to position the bar which is being fed through the machine or the turret stop 30 which is similarly positioned for each feeding operation by the indexing movements of the turret 16.

Figure 10:
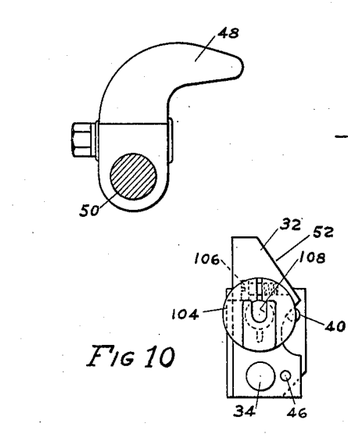
Fig. 10 is a detail view of a turret stop and the lever arm for moving this stop out of operative position to permit the ejection of the waste end of an old bar.
Figure 11:
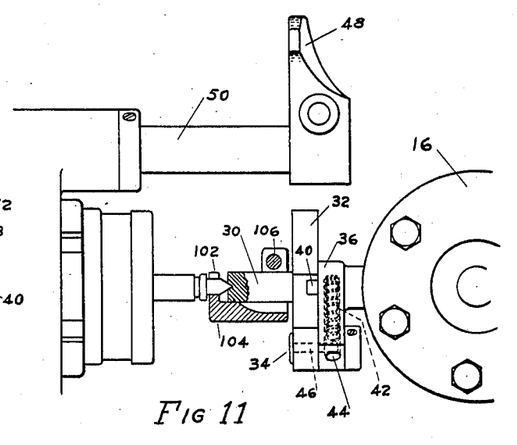
Fig. 11 is a side view of the parts shown in Fig. 10.
Figure 12:
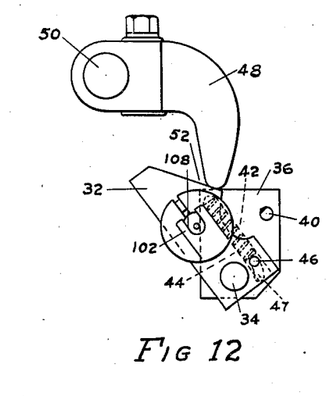
Fig. 12 is a view similar to Fig. 10, showing a different position of the parts.
Figure 13:
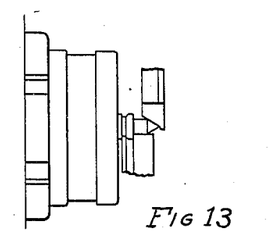
Fig. 13 is a view of certain of the parts shown in Fig. 12 in the positions taken at the completion of the cutting-off operation shown in plan.

The turret stock stop 30, as illustrated particularly in Figs. 10, 11 and 12, comprises a short bar which is recessed at its forward end to receive the pointed end of the bar of stock which is being consumed and at its rear end is mounted on an arm 32 pivotally secured at 34 to a support 36, which is held on the turret in the usual manner by the engagement of a rearwardly extending portion of the support with a corresponding aperture in the turret. The arm 32 and the stop 30 are normally held in operative position in contact with a pin 40 on the support by means of a compression spring 42 mounted in a recess 44 in the support 36 and adapted to engage at one end with a pin 46 which is secured to the arm 32 and rides in a slot 47 in the support.

When the automatic magazine feeding mechanism is thrown into operation upon the exhaustion of an old bar to place a new piece of stock in the spindle, it becomes necessary to move the stock stop 30 out of the operative position to which it is brought by the indexing movements of the turret in order to permit the ejection of the waste end of the old bar.

The stop 30 is automatically moved out of line with the spindle to permit the ejection of the waste end of the old bar by means of a swing member 48 which is secured to the rock shaft 50 and is adapted to engage a cam surface 52 on the arm 32 to swing the arm 32 and the stop 30 out of alignment with the spindle against the pressure of the spring 42.

Figure 2:
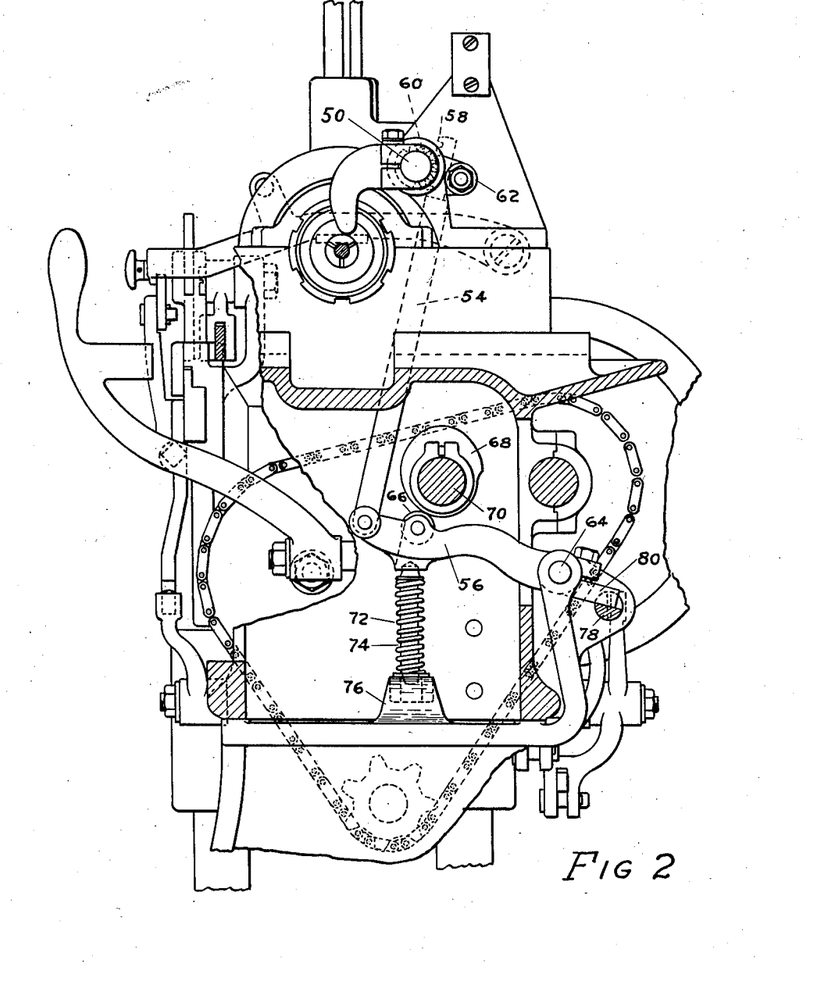
Fig. 2 is a sectional view taken on the line 2—2 of Fig. 1.

The shaft 50 is also adapted to carry the alternative swing stop 28, and when used for this purpose may be oscillated in timed relation to the operation of the machine to position the stop for each feeding movement of the bar stock by means of mechanism best shown in Fig. 2. This mechanism comprises a link 54 which is pivotally secured at its lower end to a cam lever 56 and at its upper end is provided with a rack 58 which is adapted to engage a corresponding gear segment 60 on the shaft 50. A roll 62 engages the upper end of the link to hold the rack in mesh with the gear segment. The cam lever 56 is pivotally mounted at 64 on the machine frame and carries a cam roll 66 which is held normally in engagement with a cam 68 on a shaft 70 by means of a compression spring 72 which is coiled about a plunger 74 and is interposed between the cam lever 56 and its corresponding support 76 on the machine frame.

Figures 3, 4, 5, 6:
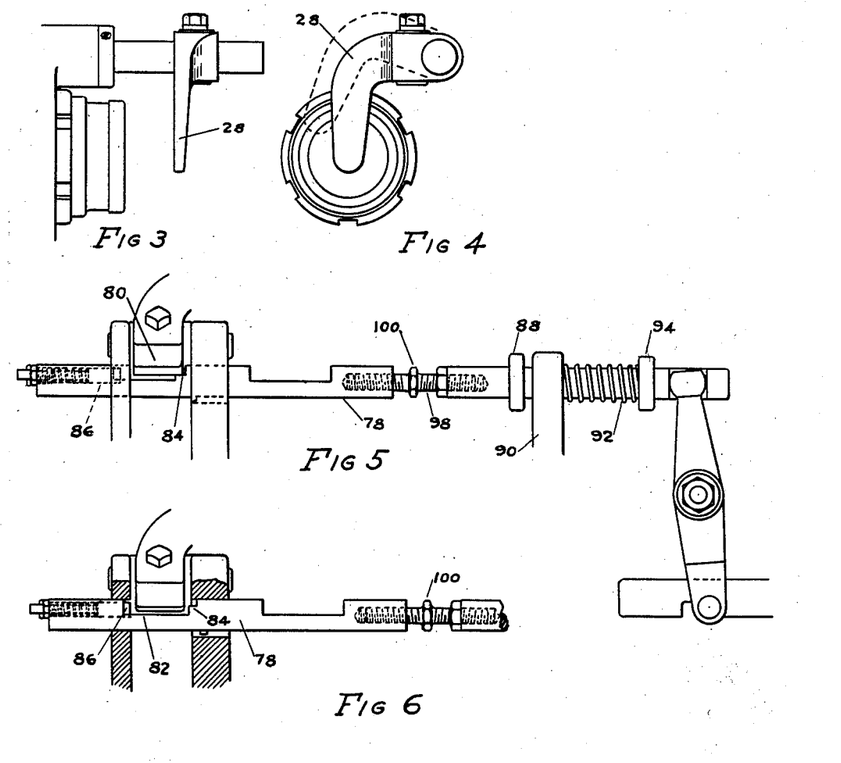
Fig. 3 is a detail view of an automatic swing stop which may be used in this machine.
Fig. 4 is an end view of the parts shown in Fig. 3.
Fig. 5 is a detail view of the control mechanism for holding the stock stop out of operative position to permit the ejection of the waste end of the old bar, adjusted for use with the swing stock stop shown in Figs. 3 and 4, the parts being shown in the position taken upon stopping the machine to hold the swing stop out of line with the spindle.
Fig. 6 is a view similar to Fig. 5, with the parts in the positions taken during the normal operation of the machine to permit a free movement of the swing stop.

In the machine disclosed in the inventor's pending application above referred to, mechanism was provided which was controlled automatically from the timing mechanism for the magazine feed to arrest the rotary movement of the rock shaft 50 and hold the swing stop out of operation upon inserting a new bar of stock in the spindle to permit the ejection of the waste end of the old bar. One feature of the present invention consists in the provision of mechanism for arresting the oscillatory movement of the rock shaft 50 which may be readily adjusted either to hold the swing stock stop 28 out of operation only upon the insertion of a new bar in the machine, or to hold the swing member 48 normally in raised position and permit it to swing down only when a new bar is being placed in the machine to move the turret stop out of line with the spindle. This mechanism comprises an axially movable member or bar 78 which is adapted to engage under an arm 80 of the cam lever 56 to hold the cam lever in depressed position against the pressure of the compression spring 72. The bar 78 is slotted at 82 to permit the arm 80 of the cam lever 56 to move freely under the influence of the cam 68 for one position of the bar 78. As shown in Fig. 6, a shoulder 84 is provided at the right-hand end of the slot, and at its left-hand end a spring plunger 86 is provided which is mounted in a recess in the end of the bar and extends into the slot 82 a short distance to form a similar shoulder at the left-hand end of the slot as shown in Fig. 6. When the slotted portion of the bar 78 is moved axially in either direction from the position shown in Fig. 6, the arm 80 will engage with the shoulder 84 or the corresponding shoulder at the other end of the slot formed by the plunger 86 to prevent further movement of the cam lever 56 and the rock shaft 50 as the roll 66 rides off the high portion of the cam 68. The control bar 78 is provided with a collar 88 and is held normally in position with the collar 88 engaging a supporting bracket 90 for the bar by means of a compression spring 92 which is coiled about the bar 78 and is inserted between a collar 94 on the bar and the opposite side of the bracket 90.

As in the construction disclosed in the inventor's above-mentioned application, the movement of the rack bar 22 and the timing mechanism to disconnect the operating tools from the driving mechanism and to render the automatic magazine feed operative to place a new piece of stock in the machine upon exhaustion of the old bar also acts to bring an abutment 96 on the rack bar into engagement with the control bar 78 to alter the position of the bar with relation to the arm 80 of the cam lever 56. In order to adapt the mechanism above described for use alternatively with the swing stock stop to hold the stop out of operation only during the insertion of a new bar in the machine, or with the turret swing stop to permit the swing member 48 to swing down only during the insertion of a new bar, the control bar 78 is made in two sections connected by a screw threaded member 98 which has formed thereon a nut 100 to permit an adjustment of the slot 82 with relation to the arm 80 of the cam lever 56. When the machine is operated with the swing stock stop 28, the screw member 98 is adjusted to bring the slot 82 opposite the arm 80 of the cam lever 56 during the normal operation of the machine. The movement of the control bar 78 under the influence of the rack bar 26 when the automatic magazine feed is thrown into operation then causes the shoulder 84 to engage under the end of the arm 80 to hold the stock stop out of operation at this time to permit the ejection of the old bar.

When the turret stock stop is employed in the machine, the screw threaded member 98 is adjusted to bring the shoulder 86 under the arm 80 of the cam lever 56 to hold the swing member 48 in raised position during the normal operation of the machine. The movement of the control bar 78 under the influence of the rack bar 26 then causes the slot 82 to be brought into alignment with the arm 80 of the cam lever 56 so that the swing member 48 is actuated in timed relation to the machine parts to move the turret stop 30 out of alignment with the spindle to permit the ejection of the waste end of the old bar.

As the rack bar 26 is withdrawn prior to putting the machine again in operation, the control bar 78 is permitted to return to its normal position under the influence of its spring 92, the arm 80 being carried to the end of the slot 82 against the spring plunger 86. The further oscillation of the cam lever 56 causes the arm 80 to be raised so that the spring plunger 86 is again permitted to slide under the arm 80 to lock the swing member 48 out of operation.

Another feature of the invention consists in the provision of an auxiliary stock stop which is particularly adapted for use in the production of small screws and similar classes of work which have a shouldered portion and a portion of reduced diameter. In the manufacture of articles of this general description, the end of the portion of reduced diameter is fed against the stock stop to position the work and the requisite tools are then brought into operation to finish and cut off the article. Also a tool is brought into operation either prior to or simultaneously with the cutting-off tool to turn the immediately preceding portion of the bar to a smaller diameter, so that in effect different operations are being performed simultaneously on two succeeding articles.

When a new bar is placed in the machine if it is desired to start off at once with automatic operation, it is necessary to position the bar for a preliminary cutting-off operation with the leading end of the bar at a point intermediate the stock stop and the end of the spindle sufficiently advanced so that a full length end section of reduced diameter will be formed, and at the same time not so far advanced that the operating tools for performing operations on the reduced portion of the bar will be brought into interference with the unshaped end of the new bar with consequent breakage of parts. If on the first cutting-off operation, a reduced portion of less than the usual length is formed, the shoulder formed will be advanced at the next feeding movement of the bar a correspondingly greater distance with a consequent danger of interference with the operating tools.

Figure 7:
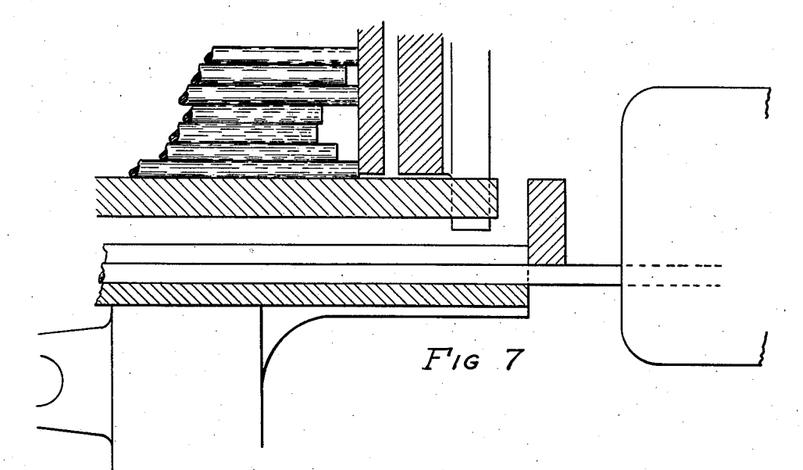
Fig. 7 is a detail view showing particularly the irregular positions of the leading ends of the bars stored in the magazine.

With the machine herein disclosed as embodying the several features of the present invention which is provided with a magazine feed and is entirely automatc in operation, difficulty has been encountered in positioning the leading end of the new bar as above described to prevent interference with the operating tools. The feed member may readily be adjusted in accordance with the requirements of the work on the feed bar to move a fixed distance beyond the rear end of the magazine to advance a new bar into the spindle an amount which will exactly correspond with the distance from the forward end of the magazine to the cutting-off tool. Due, however, to variations in the lengths of the stock stored in the magazine, as shown more particularly in Figs. 1 and 7, it is impossible to determine exactly the position to which the leading end of a new bar will be brought in the machine with the consequent risk as above pointed out of causing interference with the operating tools.

To meet this difficulty, an auxiliary stock stop is provided in accordance with the present invention to prevent the advance of the shoulder of the feeding bar into conflict with the operating tools which stop comprises a plate mounted in advance of the usual stock stop and provided with a slot having a diameter somewhat greater than the diameter of the reduced end portion of the bar and somewhat less than the diameter of the shoulder. In order to reduce the friction with the rapidly rotating spindle to a minimum, and avoid marring the surface of the shoulder on the work, the auxiliary stock stop is positioned to allow a slight clearance between the stop and the shouldered portion of the bar during the normal operation of the machine.

The auxiliary stock stop adapted for use with the turret swing stop comprises a plate 102 which is formed on the end of a bracket 104 which is clamped to the turret stop by means of a clamping screw 106. A slot indicated at 108 is formed in the plate 102 to permit the movement of the reduced end of the feeding bar into engagement with the turret stop 30 and is shaped to permit the movement of the stock stop out of operating position during the subsequent indexing of the turret 16 to bring the various operating tools into contact with the work.

Figure 8:
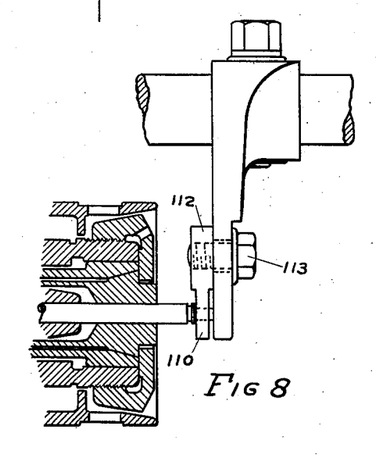
Fig. 8 is a detail view of a swing stop provided with an auxiliary stop to limit the advance of a shouldered portion of the leading end of the bar.
Figure 9:
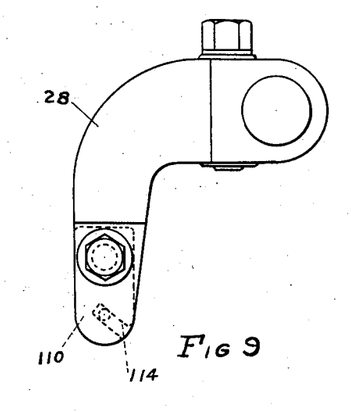
Fig. 9 is an end view of the swing stop and the auxiliary stop shown in Fig. 8.

An auxiliary stock stop having a substantially similar construction and mode of operation is provided for the swing stock stop alternatively used in the machine as illustrated in Figs. 8 and 9. This auxiliary stock stop comprises a plate 110 formed on a bracket 112 which is secured to the swing stock stop 28 by means of a screw 113. A slot 114 is cut in the plate 110 to permit the feeding of the reduced end of a bar against the swing stock stop and is shaped to permit the swing stock stop to be moved out of the way after the work has been properly positioned in the machine.

The compound stock stop herein described is particularly adapted for use with a machine of the type herein described which is provided with a magazine for storing additional stock and a magazine feeding device for automatically placing a new bar of stock in the machine upon exhaustion of an old bar, but may also be usefully employed with automatic screw and similar machines of ordinary description which are not provided with the automatic magazine feed to reduce the amount of time and effort required of the operator in getting a new bar started in the machine. With the construction and arrangement of parts herein disclosed, auxiliary stops adapted for use with work having different specifications both as to the diameter and the length of the reduced portion may readily be substituted for use on the swing stock stop and the turret stock stop of the machine.

The invention having been described, what is claimed is:

1. A machine for producing articles successively from bar stock having, in combination with operating tools, a tool support for automatically indexing successive tools for operation on the work, means for feeding a bar to present successive portions of the bar to the tools, a stock stop against which the bar is fed mounted on the support, and means rendered operative automatically by placing a new bar of stock in the machine to move the stock stop out of its normal operating position to permit the ejection of the waste end of the old bar longitudinally from the said feeding means.

2. A machine for producing articles successively from bar stock having, in combination with operating tools, a tool support for indexing the tools for successive operations on the work, a rotary spindle through which a bar is fed to present successive portions of the bar to the tools, a stock stop against which the bar is fed mounted on the support, means for automatically placing a new bar of stock in the spindle upon exhaustion of a bar, and means rendered operative upon placing a new bar in the spindle to move the stock stop out of line with the bar to permit the ejection of the waste end of the old bar.

3. A machine for producing articles successively from bar stock having, in combination, a tool support for indexing tools for successive operations on the work, a rotary spindle through which a bar is fed to present successive portions of the bar to the tools, a stock stop against which the bar is fed mounted on the support, means for automatically placing a new bar of stock in the spindle upon exhaustion of the old bar, and mechanism controlled by said means to move the stock stop out of line with the bar to permit the ejection of the waste end of the old bar.

4. A machine for producing articles successively from bar stock having, in combination with operating tools, a tool support for indexing tools for successive operations on the work, a rotary spindle through which a bar is fed to present successive portions of the bar to the tools, a stock stop mounted on the support, means for automatically placing a new bar of stock in the spindle upon exhaustion of the old bar, and a member controlled by said means to engage with and move the stock stop out of operative position to permit the ejection of the waste end of the old bar.

5. A machine for producing articles successively from bar stock having, in combination with operating tools, a tool support for indexing tools for successive operations on the work, a rotary spindle through which a bar is fed to present successive portions of the bar to the tools, a stock stop mounted on the support, means for automatically placing a new bar of stock in the spindle upon exhaustion of the old bar, mechanism acting in timed relation to the operation of the machine to move the stock stop out of operative position, and means for rendering said mechanism operative upon exhaustion of a bar to move the stock stop out of operative position to permit the ejection of the waste end of the old bar.

6. A machine for producing articles successively from bar stock having, in combination with operating tools, a hollow spindle through which the bar stock is fed to present successive portions to the operating tools, means for automatically placing a new bar of stock in the spindle upon exhaustion of the old bar, a stock stop acting in timed relation to the operation of the machine to position each successive portion of the bar to be acted upon by the operating tools, and an auxiliary stop secured to the said stock stop to limit the advance of the leading end of a new bar at a point in advance of the stock stop.

7. A machine for producing articles successively from bar stock having, in combination, a tool adapted to turn down the leading end of each article to be formed to a reduced diameter, a cutting-off tool, a hollow spindle through which the bar stock is fed to present successive portions to the said tools, means for automatically placing a new bar of stock in the spindle upon exhaustion of the old bar, a stock stop against which the bar is fed, and an auxiliary stop to limit the advance of a larger portion of a bar.

8. A machine for producing articles successively from bar stock having, in combination with operating tools, a turret for indexing tools for successive operations on the work, a rotary spindle through which a bar is fed to present successive portions of the bar to the tools, means for automatically placing a new bar of stock in the spindle upon exhaustion of the old bar, a turret stock stop, a swing stop adapted for use alternatively to the turret stop, mechanism actuated in timed relation to the machine adapted alternatively for operating a swing stop to position successive portions of the bar to be acted upon by the operating tools, and to move a turret stop out of operative position, and control means for the said mechanism adjustable alternatively to render said mechanism upon placing a new bar in the machine inoperative to hold the swing stop out of operation or operative to move the turret stop out of line with the bar to permit the ejection of the waste end of the old bar from the machine.

9. A machine for producing articles successively from bar stock having, in combination with operating tools, a tool support for indexing tools for successive operations on the work, a rotary spindle through which a bar is fed to present successive portions of the bar to the tools, a stock stop mounted on the support to permit movement of the stop out of line with the bar stock independently of movement of the support, and mechanism rendered operative upon placing a new bar in the machine to move the stock stop out of line with the bar to permit the ejection of the old bar.

10. A machine for producing articles successively from bar stock having, in combination, a cutting-off tool for cutting-off a finished article from a bar, a tool for turning down the leading end of the next succeeding article to a reduced diameter, a stock stop against which the reduced end of the bar is fed, and an auxiliary stock stop to limit the advance of that portion of the bar having the larger diameter.

11. A machine for producing articles successively from bar stock having, in combination, a cutting-off tool for cutting-off a finished article from a bar, a tool for turning down the leading end of the next succeeding article to a reduced diameter, and means against which the bar stock is fed comprising a member slotted to permit the passage of only the reduced diameter of the bar and a stop for the reduced portion of the bar.

12. A machine for producing articles successively from bar stock having, in combination, a cutting-off tool for cutting-off a finished article from a bar, a tool for turning down the leading end of the next succeeding article to a reduced diameter, a hollow spindle through which the bar stock is fed to present successive portions to the said tools, means for automatically placing a new bar of stock in the spindle upon exhaustion of the old bar, and a compound stock stop against which the reduced end of the bar is fed having surfaces to further limit the advancing movement of that portion of the leading end of a new bar having the larger diameter.

13. A machine for producing articles successively from bar stock having, in combination, a cutting-off tool for cutting-off a finished article from a bar, a tool for turning down the leading end of the next succeeding article to a reduced diameter, a stock stop against which the reduced end of the bar is fed, and a member in advance of the stock stop having a slot slightly larger than the reduced end of the bar and smaller than that portion of the bar having the larger diameter and shaped to permit the removal of the auxiliary stop after the bar is positioned against the stop.

14. A machine for producing articles successively from bar stock having, in combination, a cutting-off tool for cutting-off a finished article from a bar, a tool for turning down the leading end of the next succeeding article to a reduced diameter, and a compound stock stop comprising a stop against which the reduced end of the bar is fed and a member in advance of the stop for further limiting the advance of that portion of the leading end of the new bar having the larger diameter and positioned in accordance with the specifications of the work normally to allow a clearance between these parts.

15. A machine for producing articles successively from bar stock having, in combination, a cutting-off tool for cutting-off a finished article from a bar, a tool for turning down the leading end of the next succeeding article to a reduced diameter, means to position the bar for the next cutting-off operation, and a member positioned to limit the advance of that portion of the bar having the larger diameter.

16. A machine for producing articles successively from bar stock having, in combination, a cutting-off tool for cutting-off a finished article from a bar, a tool for turning down the leading end of the next succeeding article to a reduced diameter, a hollow spindle through which the bar stock is fed to present successive portions to the said tools, means for automatically placing a new bar of stock in the spindle upon exhaustion of the old bar, means to position the bar for the next cutting-off operation, and a member positioned to limit the advance of that portion of the bar having the larger diameter.

In testimony whereof I have signed my name to this specification.

CHARLES A. RICH.